Jan. 26, 1943 — L. W. LESSLER — 2,309,515
PHOTOGRAPHIC PRINTING FRAME
Filed April 18, 1940
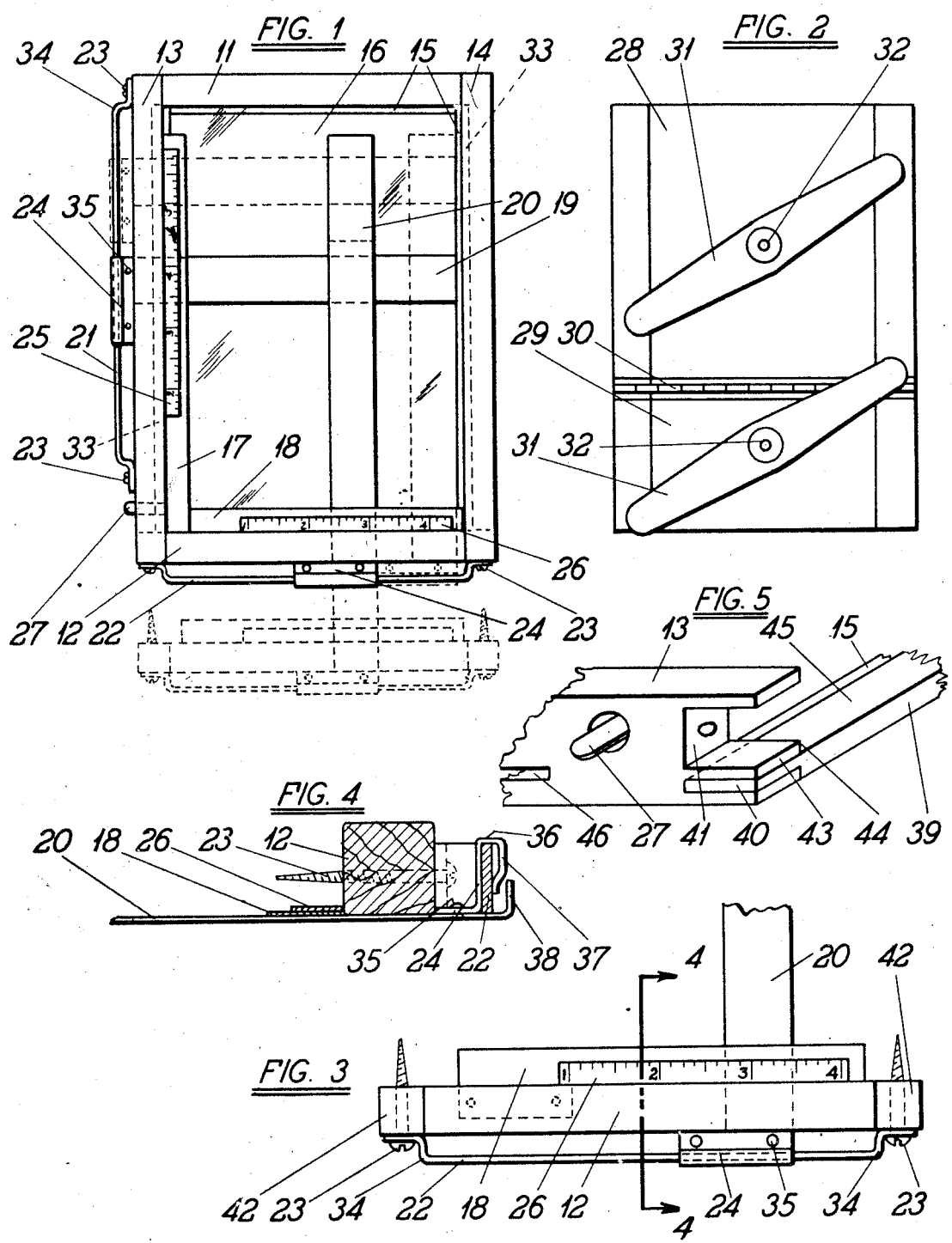
LEW W. LESSLER
INVENTOR
BY Philip S. Hopkins
William C. Babcock
ATTORNEYS Patented Jan. 26, 1943

2,309,515

UNITED STATES PATENT OFFICE 2,309,515

PHOTOGRAPHIC PRINTING FRAME

Lew W. Lessler, Binghamton, N. Y., assignor to General Aniline & Film Corporation, Binghamton, N. Y., a corporation of Delaware Application April 18, 1940, Serial No. 330,368

2 Claims. (Cl. 95—77)

This application is concerned with a photographic printing frame and more particularly with a new and useful form of construction for a print frame of the masking type.

The masking print frames previously used in the photographic field have suffered from certain disadvantages which are chiefly due to the intricacy of their construction and the difficulty of assembling and disassembling the various parts. In many such frames, for example, it was extremely difficult to replace the customary transparent glass plate, when such a plate was accidentally broken. The mounting of the masks was also complicated and gave rise to difficulties in manufacture.

With these disadvantages of the known forms of construction in view, it is accordingly one object of this invention to provide an improved form of construction for a photographic masking print frame.

A further object is to provide a form of construction for such a frame in which the various parts can be united in separate sub-assemblies which are subsequently combined to form the finished frame.

Another object is to provide such a frame with a readily removable end member which can be disconnected from the frame to facilitate the replacement of the usual transparent plate.

Further objects and advantages will be readily apparent from the following specification.

In the drawing, which forms a part of this application, and in which like reference characters indicate like parts:

Figure 1 is a top view of a printing frame constructed according to this invention, with the cover removed;

Figure 2 is a view of the cover alone;

Figure 3 is a top view of a removable frame member according to the invention;

Figure 4 is a sectional view on the line 4—4 of Figure 3; and

Figure 5 is a detail perspective view of the corner construction of the frame in Figure 1.

In order that those persons skilled in the art may fully understand the nature and scope of this invention, the following detailed and concise description is given with particular reference to the accompanying drawing.

The printing frame according to this invention consists essentially of four frame members as shown in Figure 1. Thus, the frame comprises two end frame members 11, 12, and two side frame members 13 and 14 which are joined to each other in substantially rectangular form. Along the bottom inner edge of these frame members is an inwardly projecting flange 15 which extends substantially around the periphery of the opening formed by the frame and which serves as a support for the customary transparent plate 16.

In order to mask the photographic negative to the desired size when printing, this frame is further provided with fixed and movable masking members. The fixed mask 17 is mounted on the side frame member 13 and the fixed mask 18 is similarly mounted on the adjacent end member 12. The negative is placed in one corner of the frame and is overlappingly engaged by these fixed masks along adjacent edges to form a border on said edges. The remaining two edges of the negative will be overlappingly engaged by the adjustable masks 19 and 20 which are slidably mounted on the same frame members 13 and 12 respectively. These adjustable masks are made of flexible opaque material and are readily adjustable to mask the negative to the desired area, as shown by the full line and dotted line positions of said masks in Figure 1.

The relatively fixed masks 17 and 18 are further provided with scales 25 and 26 respectively which indicate, in cooperation with the adjustable masks 19 and 20, the dimensions of the final print. Incidentally, although mask 17 has been spoken of as "fixed," this particular mask is flexibly or movably mounted to a slight extent in a manner well known in the art, so that said mask can be moved slightly away from the transparent plate 16 for ready insertion of the negative beneath said mask. This movement of the mask 17 away from the plate is accomplished by pressure on the finger piece 27 which extends through an opening in the side frame member 13.

The movable masks 19 and 20 are not mounted directly upon the frame members 13 and 12 but are slidably mounted upon guide strips 21 and 22 which are, in turn, fastened to the frame members as shown. These guide members 21, 22 are preferably formed from flat metal strips which are offset at their ends, as shown at 34, said ends being attachable to the frame members by screws 23. Because of the offset portions 34, the major portion of the guides 21, 22 will be spaced uniformly from the frame members 13, 12. The masks 19 and 20, attached to these guides, extend from said guides to the interior of the frame through slots in the frame members 12 and 13. Thus, member 13 is provided with a slot 46 (Fig. 5) for the mask 19. Similarly, the end member 12 forms one side of a similar slot for the mask 20 in a manner to be described below. The advantage of using flat strip material for the guides 21 and 22 lies in the relative ease with which these guides may be formed and subsequently attached to the frame members.

The usual cover is provided for this masking frame and is shown in Figure 2. This cover consists of two portions 28 and 29 which are hinged together at 30. Each portion is provided with a spring retaining member 31 pivotally mounted thereon at 32. When the customary negative and printing papers have been placed in the frame, the cover is then placed over the negative and paper and is held in position by engagement of the ends of the rotatable spring members 31 with the recessed portions or grooves 33 in the side frame members 13 and 14.

The method of attachment of the movable masks 19 and 20 to the flat guides 21 will now be described. As shown in Figures 3 and 4, the mask member 20 engages the lower edge of the guide strip 22 and the end of the masking member is turned up, as shown at 38, to provide a smooth finish for this part of the construction. A spring clip 24 is attached to the masking member adjacent the guide strip 22. Any suitable means of attachment may be employed as, for example, the rivets 35. The spring clip 24 then extends along one surface of the guide strip 22, around the other edge of the guide strip as at 36, and is bent back as at 37 to engage the remaining surface of the guide. This clip 24 is made of any suitable resilient material, and the engagement of said clip with the guide is sufficient to maintain the guide in its adjusted position. The frictional engagement of the spring clip does not, however, prevent the operator from moving the mask 20 along the guide 22 to any desired position.

It will now be apparent that the mask 20, the guide 22, and the spring clip 24 may be separately formed and aassembled to constitute a sub-assembly which can later be attached to the frame by insertion of the mask in the previously mentioned slots and by fastening the guide to the frame member by the screws 23. The riveting or other fastening of the spring clip 24 to the mask 20 is accordingly much more readily accomplished when this assembly is made separately than when the guides and masks are already in position on the printing frame.

As mentioned above, it is often extremely difficult to remove the transparent plate 16 in previously known forms of construction. In the present case, for example, the plate is supported along the edges of one surface by the flanges 15 on the frame members. The other surface of the plate is engaged by the fixed and the movable masks 17—20 and the glass is accordingly retained in position. In order to facilitate the removal and replacement of this glass or transparent plate, the end frame member 12 has been joined to the side frame members 13 and 14 in such a way that the end member 12 may be readily removed as a unit with the masks 18 and 20. Figure 1 shows, in dotted outline, how this end member is readily removed by disengaging the screws 23 from the side frame members 13 and 14. Figure 3 shows the end member and masks as a separate unit. Figure 5 shows part of the fingered connection between member 12 and one of the side members.

It will be readily apparent that, with this end member removed, it will be a simple matter to flex the remaining mask 19 sufficiently to permit the lifting of one edge of the plate and the removal of said plate over the side frame member 14.

If the end member 12 formed the only connection between the side frame members 13 and 14 at this particular end of the frame, these side frame members could be easily forced out of position when the end member 12 is removed. According to this invention, therefore, an additional end member or spacer 39 is provided as shown in Figure 5. This spacing bar 39 is interlockingly engaged with the side members 13 and 14 as shown at 40, and maintains the side members in their proper spaced relation even when the end member 12 is removed. Bar 39 carries flange 15 which supports the transparent plate at this end of the frame.

The side members 13 and 14 are cut back as at 41 to accommodate the reduced ends 42 of the end member 12 in what is generally known as a fingered connection. Instead of permitting the member 12 to engage directly with the surface 45 of the spacing bar 39, the strip 43 is left on the side members 13, 14 when portion 41 is cut back. Thus, when the end member 12 is engaged with the recessed side frame members, the surface of member 12 will be spaced from surface 45 of the member 39 by a distance equal to the length of the edge 44 on the strip 43. This space between the members 12 and 39 serves as a slot through which the mask 20 is inserted, and this slot is therefore the equivalent of the previously mentioned slot 46 in the side frame member 13. Member 12 is fastened to the side frame members 13 and 14 by the same screws 23 which hold guide bar 22 in assembled position. Thus a very simple and compact form of construction is obtained.

It is believed apparent from the foregoing description that a form of construction has been provided which offers substantial advantages in construction and assembly over the previously known printing frame constructions. The present invention is accordingly not to be restricted to the exact form of construction shown in the drawings but is to be interpreted as covering any substantially equivalent structure which incorporates the advantages specified in the present case and which falls within the scope of the appended claims.

Now therefore I claim:

1. A photographic printing frame comprising side members and end members joined to form a rectangular frame, a transparent plate mounted in said frame, supporting means on said frame members engaging the edges of one surface of said plate, a masking member on at least one of said frame members and engaging the other surface of said plate, one of said frame members having a fingered connection with the adjacent frame members, said one member being readily separable from said adjacent members for ready removal and replacement of said plate, and a non-removable connecting bar between said adjacent frame members for maintaining said members in proper spaced relation when said one member is separated therefrom.

2. A photographic printing frame comprising side members and end members joined to form a rectangular frame, a transparent plate mounted in said frame, supporting means on said frame members engaging the edges of one surface of said plate, a masking member on at least one of said frame members and engaging the other surface of said plate, one of said frame members having a removable connection with adjacent frame members, said one member being readily separable from said adjacent members for ready removal and replacement of said plate, and a non-removable connecting bar between said adjacent frame members for maintaining said members in proper spaced relation when said one member is separated therefrom.

LEW W. LESSLER.